May 6, 1969  R. G. SMITH  3,442,490
FLUSH VALVE

Filed Feb. 10, 1967  Sheet 1 of 4

INVENTOR.
RUSSELL G. SMITH
BY
J. Warren Kinney Jr.
ATTORNEY

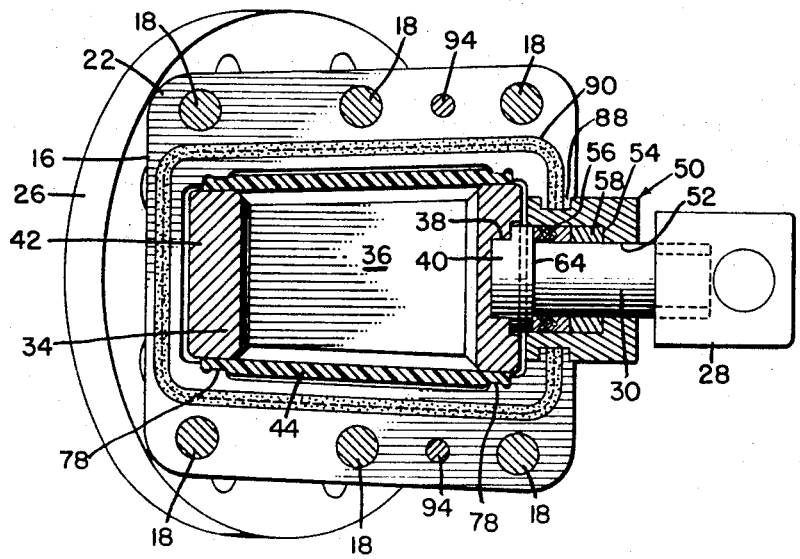
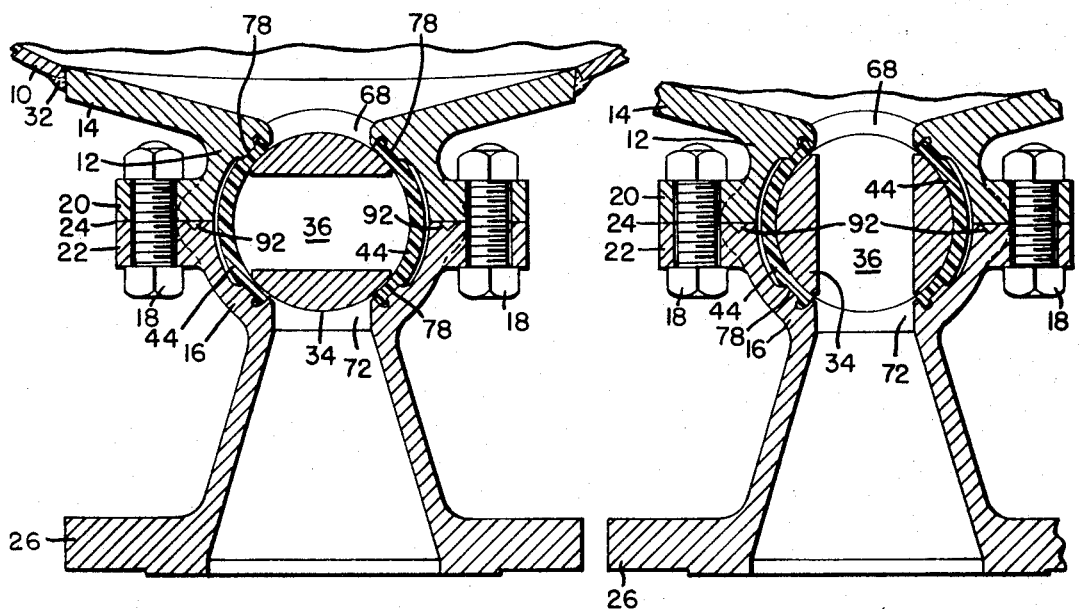

May 6, 1969
R. G. SMITH
3,442,490
FLUSH VALVE
Filed Feb. 10, 1967
Sheet 3 of 4
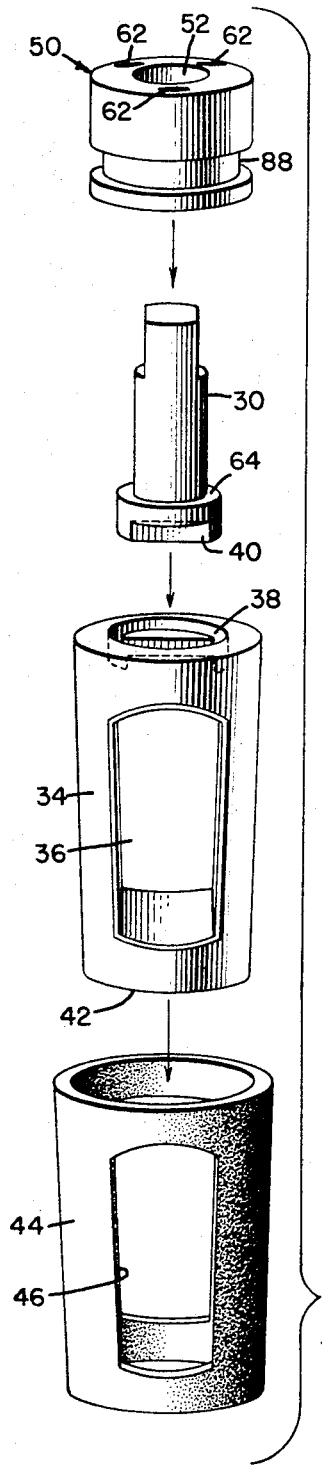
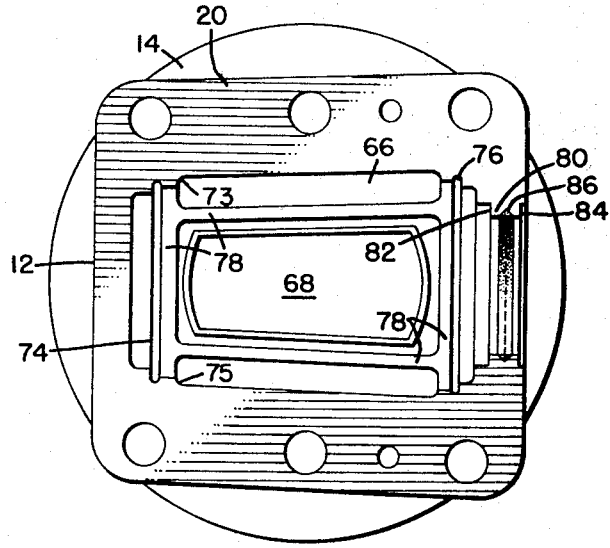
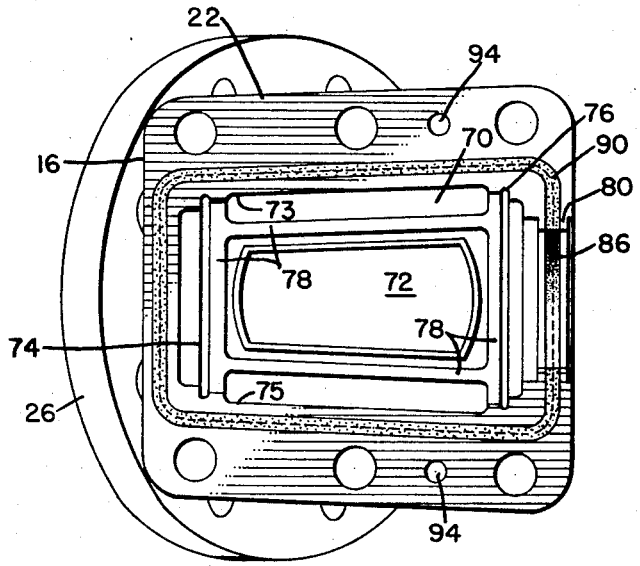
INVENTOR.
RUSSELL G. SMITH
BY
J. Warren Kinney, Jr.
ATTORNEY

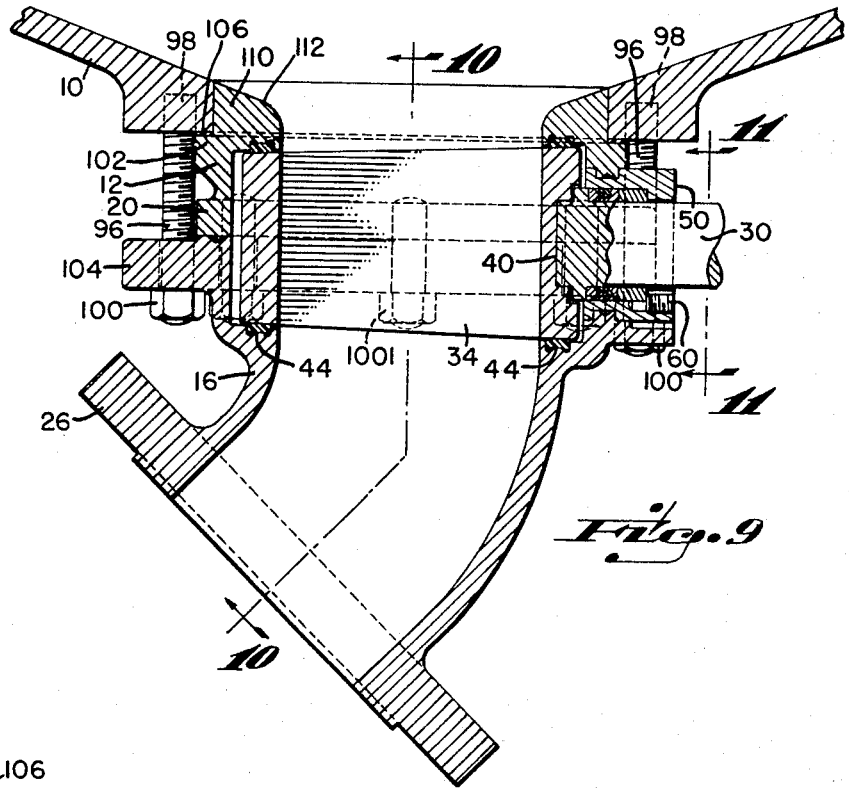
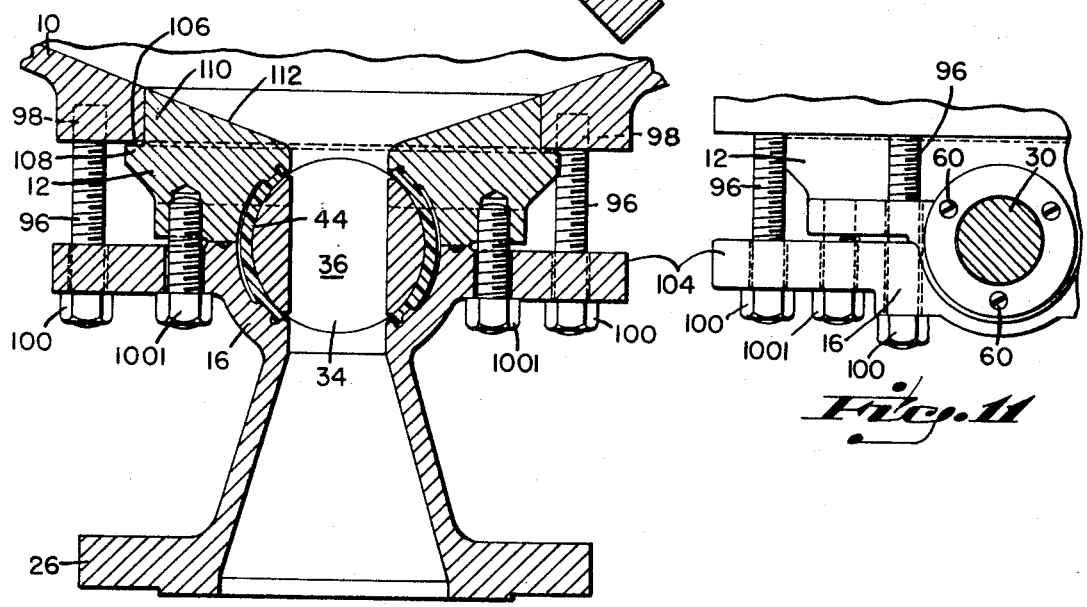

United States Patent Office 3,442,490
Patented May 6, 1969

3,442,490
FLUSH VALVE
Russell G. Smith, Cincinnati, Ohio, assignor to Continental Manufacturing Company, Cincinnati, Ohio, a corporation of Ohio
Filed Feb. 10, 1967, Ser. No. 615,151
Int. Cl. F16k 5/02
U.S. Cl. 251—317                          11 Claims

ABSTRACT OF THE DISCLOSURE

The plug valve for application to a tank wall, is constructed of two body half-sections, one having a mounting flange for insertion into an opening of a tank wall, wherein said flange is fixable by welding or otherwise, and the other half-section being detachably mountable upon said one half-section; both of said half sections being adapted to support a non-rotatable cylindrical packing sleeve in which may be rotated an operating stem which is separate from the valve plug but in driving relation thereto, the sleeve receiving equal support from both half-sections.

---

The invention relates to a flush valve, of a type adapted particularly for application to tank bottom walls.

An object of the invention is to provide an improved flush valve, incorporating means to facilitate and expedite application of the valve to a tank bottom wall, with great security and substantial savings of time and labor.

Another object of the invention is to ensure the application of a flush valve to a tank wall, without warp or damage to the valve which might depreciate the effectiveness of the valve as a tight closure for the tank.

Another object is to provide a valve of the character stated, operating parts of which may be renewed or replaced expeditiously and economically, and without seriously interfering with continued use of the tank in service.

A further object of the invention is to provide mechanical improvements in a flush valve, which extend the service period of the valve, minimize the possibility of fluid leakage, and reduce the cost of servicing.

The foregoing and other objects are attained by the means described herein, and illustrated upon the accompanying drawings, in which:

FIG. 3 is a cross-sectional view taken on line 3—3 of FIG. 2.

FIG. 4 is a cross-section taken on line 4—4 of FIG. 2 showing the valve in closed position.

FIG. 5 is a view similar to FIG. 4, the valve being open.

FIG. 6 is an exploded perspective view of principal parts constituting the valve plug.

FIG. 7 is a plan view of one body section of the valve, the valve plug assembly being omitted.

FIG. 8 is a plan view of a second body section to coincide with the body section of FIG. 7, the valve plug assembly being omitted.

FIG. 9 is a modification of the FIG. 2 structure.

FIG. 10 is a cross-section on line 10—10 of FIG. 9.

FIG. 11 is a cross-section on line 11—11 of FIG. 9.

Figure 1:
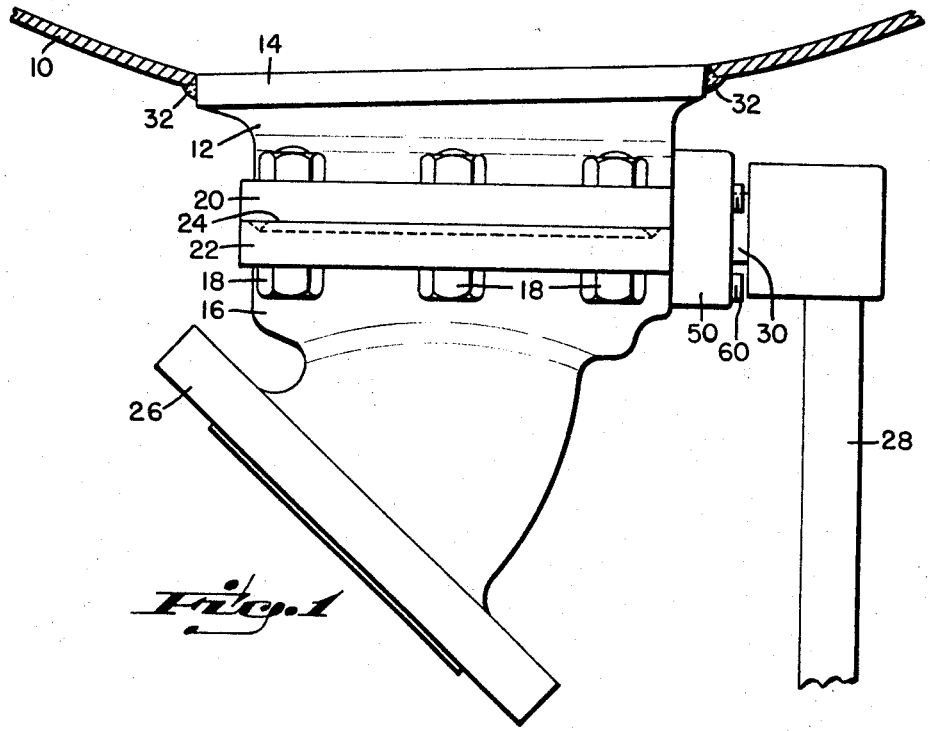
FIG. 1 is a side elevational view of the improved valve, shown applied to an arcuate wall of a tank.
Figure 2:
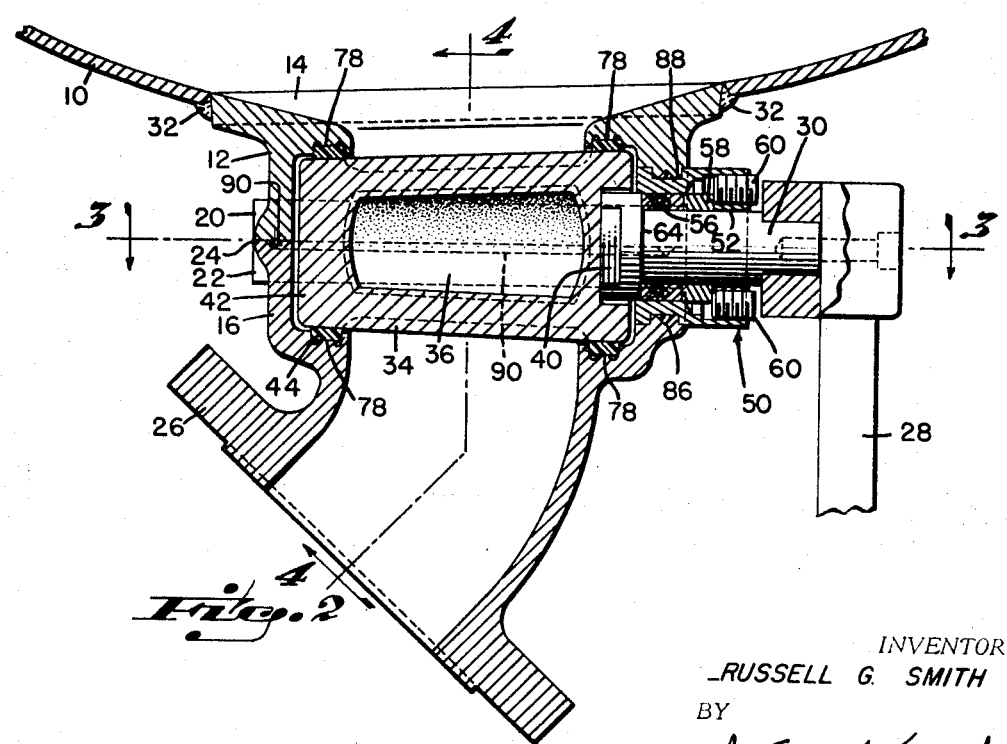
FIG. 2 is a vertical cross-section through the valve and tank of FIG. 1.

In FIGS. 1 and 2, the reference character 10 indicates a convex wall of a tank, to which a flush valve may be applied. According to the present invention, the flush valve comprises a valve body half-section 12 which includes a mounting flange 14, and a second, cooperative body half-section 16, to be mounted upon body section 12. The sections may be joined one to the other, by means of bolts 18 passing through aligned openings in coinciding parting flanges 20 and 22 formed integrally with the body half-sections 12 and 16, respectively. The valve chamber for the valve plug is rendered accessible by removing the bolts 18, and dropping body section 16 from section 12, along the parting line 24.

Body section 16 may carry an integral connecting flange 26, whereby a drain pipe (not shown) may be attached to body section 16 for conveying waste fluid released from tank 10 through the valve. The valve may be manipulated by means of an operating handle 28 applied to the outer end of plug stem 30.

The mounting flange 14 of body section 12, is adapted for connection with tank wall 10 by means of a weld 32 applied circumferentially of flange 14. The flange preferably is fitted within a hole cut into the tank wall prior to welding. Mounting flange 14 is seen to be quite large in diameter, so as to absorb welding heat at a substantial distance from the body chamber for plug 34, thereby to prevent any warping or misshaping of body section 12 as it is permanently welded to the tank wall.

Valve plug 34 is uniformly tapered, and provided with the usual transverse port 36 intermediate its ends. The larger end of the plug has a channeled socket 38 into which may be introduced the key 40 formed on one end of stem 30, whereby rotation of the stem enforces rotation of the valve plug. The opposite end of the valve plug may be closed, as at 42.

The valve plug is adapted for rotation within a correspondingly tapered sleeve 44 which is fixed against rotation relative to the valve body sections 12 and 16. The sleeve has opposed port openings 46 to register with plug port 36, and the material of which the sleeve is formed shall be a sealing material, preferably Teflon or its equivalent. The length of sleeve 44 approximates the length of plug 34, and exceeds the length of plug port 36. Plug 34 preferably is of non-corrosive metal, and of one-piece construction.

As best illustrated by FIGS. 2, 3 and 6, operating stem 30 may be maintained in driving relationship with plug 34, by means of a one-piece cylindrical packing cage 50 which is axially bored at 52 to rotationally support stem 30. A counterbore 54 accommodates packing material 56 and at least one metallic packing ring 58 at the base of the counterbore. A plurality of adjusting screws 60 engaging threaded bores 62 formed in cage member 50, serve to advance packing ring 58 against the packing material 56, and compact said material about operating stem 30, between ring 58 and the shoulder 64 of said stem. Packing cage 50 is bodily supported against rotation and longitudinal shifting, by reason of firm contact thereof with the valve body sections 12 and 16, as will be explained.

The valve body half-sections 12 and 16 (FIGS. 7 and 8), are each recessed to accommodate one-half of the valve plug assembly illustrated by FIG. 6, so that a plane which includes the parting line of flanges 20 and 22, bisects the valve assembly along its axis of rotation. The recess 66 of body section 12 includes an inlet port 68, and the recess 70 of body section 16 includes an outlet port 72, these ports being approximately opposed to one another when the body sections are assembled (FIG. 5).

Each of the recesses 66 and 70 may be grooved at 74, to provide a continuous annular groove when the body sections are assembled. Similarly, said recesses may be grooved at 76, with grooves 76 and 74 separated from one another a distance greater than the length of sleeve aperture 46, and less than the overall length of the sleeve. The annular grooves, cooperating with longitudinal grooves 73 and 75 extending lengthwise of the valve body recesses 66 and 70, define a plurality of connected ribs 78 which circumscribe the inlet port 68 and outlet port 72. The ribs project toward the axis of rotation of the valve plug. Sleeve 44, which is distortable to a limited degree, contacts these ribs and is forcefully pressed thereon, to provide areas of high pressure surrounding the ports 68 and 72. The high pressure areas effectively seal the valve plug against leakage of fluid along the plug, while at the same time locking the sleeve 44 against shifting relative to the body sections. At locations within the recesses 66 and 70 where no ribs are present, the sleeve is only lightly compressed and will therefore present low pressure areas which, though contacting the plug and sealing against it, serve to reduce frictional contact opposing rotation of the valve plug. The arrangement ensures easy plug rotation, with effective sealing.

At the stem end of recess 66, FIG. 7, there is provided an inwardly directed annulus or rib 80, presenting shoulders 82 and 84 at opposite sides thereof. Said annulus is circumferentially grooved to support a packing material 86. In like manner, the body section 16 of FIG. 8 is similarly treated to present an annulus or rib 80, grooved and packed at 86, so that upon assembly of the body sections, the ribs 80, 80 and packings 86, 86, cooperate to furnish a continuous circular rib and packing seal.

Ribs 80 are accommodated within an annular groove 88 of packing cage 50, FIG. 2 and the packings 86 bear against the base of groove 88 to prevent fluid leakage past the cage. Shoulders 82 and 84 of the ribs 80 may bear against the sides of cage groove 88, to prevent axial shifting of the cage.

At the line of parting of body sections 12 and 16, a seal may be provided so as to preclude leakage of fluid between the flanges 20 and 22. Such a seal is shown at 90, FIG. 8, and will be seen to extend circumferentially about recess 70, with opposite ends meeting the packing 86 at rib 80. Accordingly, when one body section is superposed upon the other, as in FIG. 2, the packings 90 and 86 form a continuous seal surrounding the valve plug chamber and cage 50, to effectively preclude fluid leakage from the chamber comprising recesses 66 and 70. To avoid destruction incident to application of weld 32, the packing 90 preferably is carried by the flange 22 of body section 16. The flange carrying the packing material 90 preferably is grooved circumferentially of recess 70, to accommodate and retain the packing material. Such a groove is indicated at 92 upon FIGS. 4 and 5.

The packing materials at 86 and 90 may be of any suitable type, including such materials as Teflon, rubber, or the like.

In applying the valve to a tank or the like, the body half-section flange 14 may be welded to the tank as at 32. Then, the valve plug assembly comprising the parts of FIG. 6 may be laid into the recess 70 of FIG. 8, whereupon body half-section 16 may be placed against the body half-section 12 with their flanges 20 and 22 coinciding. Proper alignment of the sections may be obtained by means of guide pins 94. The bolts 18 then may be applied for clamping the flanges 20 and 22 together, this clamping being effective to set the sleeve 44 relative to ribs 78. Thereafter, the adjusting screws 60 may be manipulated to compress the packing material 56 about operating stem 30, after which the operating handle 28 may be attached to the stem.

The procedure outlined above may be reversed, for disassembling the valve and replacing parts when necessary, except for detaching body section 12 from the tank at weld 32. Body section 12 will rarely require replacement, if ever. Should replacements of valve plug parts or packings become necessary, this is accomplished easily and speedily with the removal of bolts 18, and replacement thereof after substituting a new plug assembly for the used one. The time required for effecting the substitution is minimal, so there is no need to interrupt the service of the tank for any extended period of time.

It may here be noted that sleeve 44 in some instances may be preformed to substantially fit the several ribs 78 and grooves 73, 74, 75, 76, so that tightening of bolts 18 need not be depended upon entirely, for distorting the sleeve in fitting it to the valve body sections. The plug assembly comprising the parts of FIG. 6, may be factory preassembled and adjusted for instant placement within the body chamber 66, 70, thereby to greatly facilitate and expedite reconditioning of the valve.

FIGS. 9, 10 and 11 illustrate a modification of the flush valve which is concerned primarily with eliminating the weld at 32, and securing the valve to the tank bottom detachably, as by means of screw-threaded fasteners 96. The fasteners 96 may be in the form of conventional screws, or if desired, may be threaded studs anchored at 98 in the reinforced metal of the tank bottom, and provided with removable nuts 100. Screws 1001 corresponding to the bolts 18 of FIGS. 1 to 5, detachably secure the lower half-section 16 of the valve to the upper half-section 12, in the manner and for the purposes previously described herein.

In order to mount the valve upon the tank 10 by means of the fasteners 96, the lower section 16 of the valve may be provided with a series of integral laterally projected perforate lugs or ears 104, each of which is receptive of a fastener screw or stud 96 as shown. Fasteners 96 perform normally to compress an annular gasket 106 between the tank bottom and a flange or shoulder 108 on valve section 12, to prevent leakage of fluid at the connection. A neck 110 on valve section 12 may project concentrically from shoulder 108 into the bottom opening of the tank, and may include an upper surface 112 inclined to direct fluid toward the inlet port of valve section 12.

In view of the foregoing explanation, it is readily evident that the assembled valve in its entirety may be quickly detached from tank 10 after removing the several nuts 100, whenever necessary. Thereafter, the valve may be disassembled by removing the screws 1001, for purposes of any servicing that may be required. The arrangement disclosed provides for quick and easy substitution of valves at the tank outlet.

Except for the above-mentioned modification dealing with mounting of the valve upon tank 10, the valve of FIGS. 9, 10 and 11 may be in all respects substantially similar to the valve of FIGS. 1 through 8.

It is to be understood that various modifications and changes may be made in the structural details of the valve, within the scope of the appended claims, without departing from the spirit of the invention.

What is claimed is:

1. A plug valve for application to a tank wall comprising in combination: a substantially cylindrical valving plug axially rotatable, said plug being apertured transversely to provide a plug port; a pair of valve body half-sections each having a port-apertured recess therein; a substantially cylindrical sealing sleeve encircling the valving plug substantially throughout its length, said sleeve having opposed port apertures therein to register with the body ports; the recesses of the valve body half-sections being each contoured to accommodate one-half of the sleeve at one side of a plane which includes the sleeve axis and bisects the sleeve; a mounting flange on one of said half-sections, adapted for insertion into and fixation within an aperture of a tank wall, means detachably mounting the body half-sections one upon the other, with the sleeve and its inserted plug confined within the body half-section recesses; means precluding rotation of the sleeve while the plug rotates therein; and means for selectively rotating said plug, including an elongate operating stem for the plug, and a separable driving connection between one end of the stem and one end of the plug; a substantially cylindrical axially bored packing cage rotationally supporting the stem, and packing material within said cage and surrounding the stem; the body half-sections each being contoured adjacent to the driving connection, to accommodate one-half of the substantially cylindrical cage at one side of a plane which bisects the cage along the cage axis; the cage being supported equally by the body half-sections incident to mounting of the body half-sections one upon the other; and gasketing means on said half-sections sealing against the packing cage circumferentially thereof.

2. The valve as specified by claim 1, wherein the mounting flange of said one valve body half-section fitted within the tank wall aperture is weldable to said tank wall, with the port of said one valve body half-section in communication with the interior of the tank.

3. The valve as specified by claim 1, wherein is included gasket means compressible between the body half-sections incident to mounting of said half-sections one upon the other.

4. The valve as specified by claim 1, wherein is included cooperative means on the packing cage and both body half-sections, precluding axial shifting of the packing cage.

5. The valve as specified by claim 1, wherein the packing cage includes adjustable means for applying compressive force to the packing material surrounding the operating stem.

6. The valve as specified by claim 1, wherein the valving plug, the sealing sleeve, the operating stem, and the packing cage, constitute a unitary assembly bodily mountable and dismountable relative to the body half-sections.

7. The valve as specified by claim 6, wherein one of the body half-sections includes a mounting flange weldable to a wall of a tank, with the port of said one valve body half-section in communication with the interior of the tank.

8. The valve as specified by claim 1, wherein is included gasket means compressible between the body half-sections incident to mounting of said half-sections one upon the other, said gasket means being attached to that body half-section which is not weldable to the tank wall.

9. The valve as specified by claim 1, wherein the recesses of both body half-sections include means for producing high pressure and low pressure plug contact areas upon the sealing sleeve, the high pressure contact areas bounding the ports of both body half-sections.

10. The valve as specified by claim 1, wherein the recesses of both body half-sections include means for producing high pressure and low pressure plug contact areas upon the sealing sleeve, the high pressure contact areas bounding the ports of both body half-sections.

11. The valve as specified by claim 1, wherein dismounting of one body half-section from the other body half-section, releases as a displaceable unit the plug, the sealing sleeve, the operating stem, and the packing cage.

References Cited

UNITED STATES PATENTS 3,128,987   4/1964   O'Connor _____ 251—317 X

FOREIGN PATENTS 867,610   5/1961   Great Britain.
977,244   12/1964   Great Britain.

SAMUEL SCOTT, *Primary Examiner.*

U.S. Cl. X.R.

251—367